United States Patent [19]

Miller

[11] 4,172,393
[45] Oct. 30, 1979

[54] PLANETARY GEARING

[75] Inventor: Albert A. Miller, Galashiels, Scotland

[73] Assignee: AB Volvo, Goteberg, Sweden

[21] Appl. No.: 861,930

[22] Filed: Dec. 19, 1977

[30] Foreign Application Priority Data

Dec. 22, 1976 [GB] United Kingdom ............... 53674/76

[51] Int. Cl.² ............................................. F16H 57/10
[52] U.S. Cl. ......................................... 74/759; 74/765
[58] Field of Search .................. 74/759, 753, 765, 764

[56] References Cited

U.S. PATENT DOCUMENTS

| | | | |
|---|---|---|---|
| 3,067,632 | 12/1962 | Foerster et al. | 74/759 |
| 3,238,817 | 3/1966 | Schwab | 74/765 X |
| 3,398,606 | 8/1968 | Utter | 74/759 |
| 3,996,817 | 12/1976 | Winzeler | 74/765 |

FOREIGN PATENT DOCUMENTS

| | | | |
|---|---|---|---|
| 2447581 | 4/1976 | Fed. Rep. of Germany | 74/759 |
| 1217364 | 12/1970 | United Kingdom | 74/759 |

Primary Examiner—C. J. Husar
Assistant Examiner—Lance W. Chandler
Attorney, Agent, or Firm—Blanchard, Flynn, Thiel, Boutell & Tanis

[57] ABSTRACT

Planetary gearing for vehicles such as earth-moving loaders gives a plurality of forward ratios and a plurality of reverse ratios each approximately equal to one of the forward ratios. The gearing has four planetary gear sets with input clutches selectively driving sun gears of the first and second sets. The output is connected to the planet carrier of the first set and to sun or ring gears of the third and fourth sets. One other element of the third set is connected to one other element of the fourth set and to releasable holding means. The remaining element of the fourth set is connected to the annulus of the first set of the planet carrier of the second set.

4 Claims, 4 Drawing Figures

PLANETARY GEARING

This invention relates to planetary transmissions particularly suitable for vehicles which during their work have to travel comparable distances in the forward and reverse directions. Examples of such vehicles are earth-moving vehicles such as loaders. Such vehicles require a range of forward transmissions ratios and a broadly comparable range of reverse ratios, although exact equality of forward and reverse ratios is not essential and the reverse range may for example have one less ratio than the forward range. For example, desirable ratios for an average loader transmission are as follows:

Forward: 1st 6.76, 2nd 3.33, 3rd 1.8, 4th 1.0 (direct)
Reverse: 1st 6.0, 2nd 3.5, 3rd 1.85

British Patent specification No. 1,331,048 discloses a planetary transmission comprising three simple epicyclic gear trains in compound connection yielding three forward reduction ratios and a direct drive, as well as two reverse ratios, when provided with two input clutches and three braked reaction members.

If two simple epicyclic trains are compound-connected as indicated in either FIG. 1 or FIG. 2 of the accompanying drawings and their components have tooth numbers as shown in Table I, the resultant ratios available are three forward and one reverse ratio having values corresponding approximately to the desired 2nd, 3rd and 4th forward ratios and to the desired 3rd reverse ratio respectively, as indicated above.

Table I

|          |           | FIG. 1 | | FIG. 2 | |
|----------|-----------|--------|----|--------|----|
|          | Train No. | 2      | 1  | 2      | 1  |
| Teeth in: | Ring Gear | 78     | 84 | 84     | 84 |
|          | Planet    | 18     | 24 | 18     | 24 |
|          | Sun Gear  | 42     | 36 | 48     | 36 |

Now, if supplementary epicyclic gear train is compound-connected to train 1 to provide a supplementary low forward ratio, it could be connected either as shown in FIG. 4 of specification No. 1,331,048 or alternatively it could be connected as described in lines 68–75 in Page 2 of that specification. The former method, however, would provide a 1st forward ratio which is too high, while the latter method would provide one which is too low. The arrangement would also be deficient insofar as it would yield only two reverse ratios.

According to the present invention there is provided a multi-speed planetary transmission for a vehicle comprising a plurality of planetary gear sets each comprising an externally toothed sun gear, an internally toothed ring gear coaxial with the sun gear, and at least one planet gear meshing with both the sun gear and the ring gear and rotatably mounted on a planet carrier which is rotatable about the common axis of the sun gear and ring gear, in which the planet carrier of the first set is connected to an output member of the transmission, the planet carrier of the second set is connected to the ring gear of the first set and to releasable holding means, the sun gear of the first set is connected through a first disengageable coupling to the input member of the transmission, and the sun gear or ring gear of the second gear set is connected to releasable holding means and through a second disengageable coupling to the input member, characterised in that third and fourth gear sets each have a first element connected to the output member, second elements connected to each other and to releasable holding means while the third element of the third set is connected to further releasable holding means and the third element of the fourth set is connected to the ring gear of the first set; the third element of the third set may be the planet carrier thereof.

Thus, in one preferred embodiment, the first elements of the third and fourth sets are their sun gears and the second element of the third set is its ring gear while the second element of the fourth set is its planet carrier.

In another embodiment, the first elements of the third and fourth sets are respectively the ring gear and the sun gear while the second elements are respectively the sun gear and the ring gear.

Figure 1:
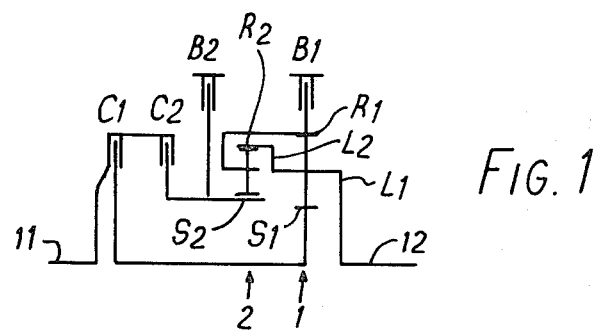
FIG. 1 shows a multi-forward speed planetary transmission.

The invention will now be described further by way of example with reference to the accompanying drawings, the transmissions shown in FIGS. 3 and 4 being in accordance with the invention.

Each of the four transmissions shown comprises a plurality of planetary gear sets each of which comprises a sun gear S, a ring gear R, a set of planet pinions P which mesh with both the sun gear and the ring gear, and a planet carrier L on which the planets P are rotatably mounted, the planet carrier L being itself mounted for rotation about an axis coincident with the common axis of the sun gear and ring gear and with input and output members 11 and 12 respectively for the transmission.

In each of the Figures, each gear set is indicated by a numeral and its component elements are indicated by the appropriate letter with the number of gear set as a subscript.

In addition to the connections between the various components of the gear sets and the input and output members 11 and 12 as shown in the drawings, the gear set components are also connected to independently operable releasable holdings indicated by the letter B while the input 11 is connected to the appropriate parts of the transmission through independently operable clutches C1 and C2.

Figure 2:
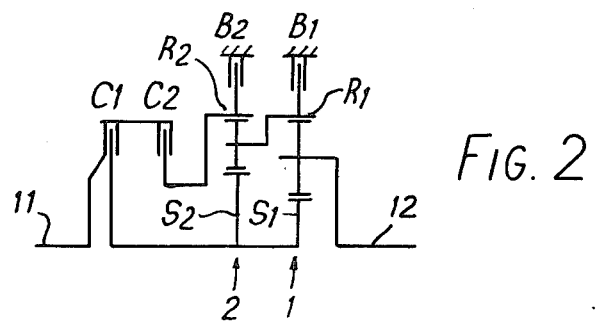
FIG. 2 shows a modification of the transmission of FIG. 1.

In the transmissions shown in FIGS. 1 and 2, the various forward and reverse ratios are engaged by energising the clutches and or brakes indicated in Tables II and III respectively to obtain the values for the ratios also shown in the respective tables.

Table II

| Forward Ratios | | | |
|---|---|---|---|
| C1 | + | B1 | 3.33 :1 |
| C1 | + | B2 | 1.816:1 |
| C1 | + | C2 | 1.0 :1 |

| Reverse Ratio | | | |
|---|---|---|---|
| C2 | + | B1 | −1.857:1 |

Table III

| Forward Ratios | | | |
|---|---|---|---|
| C1 | + | B1 | 3.33 :1 |
| C1 | + | B2 | 1.804:1 |
| C1 | + | C2 | 1.0 :1 |

| Reverse Ratio | | | |
|---|---|---|---|
| C2 | + | B1 | −1.904:1 |

Figure 3:
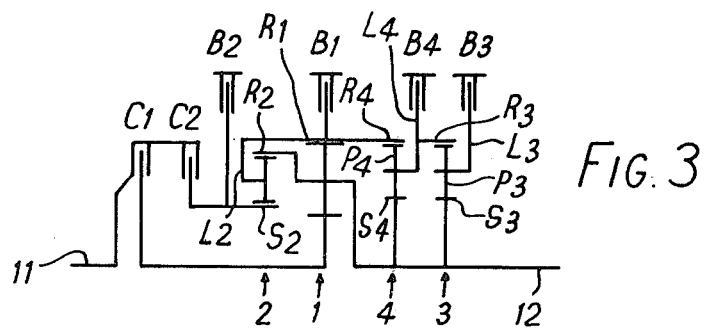
FIG. 3 shows a multi-forward and reverse transmission which incorporates the transmission of FIG. 1.

The embodiment of the invention shown in FIG. 3 has two further gear sets 3 and 4 each having their sun gear S3, S4 connected to the output shaft 12. The planet carriers L3, L4 are connected to independent braking means B3, B4 while the planet carrier L4 is also connected to the ring gear R3 of the third set. The ring gear R4 of the fourth set is connected to the ring gear R1 of the first set and to first braking means B1 and to the planet carrier L2 of the second gear set. The input member 11 can be selectively coupled by clutches C1, C2 to the sun gear S1 of the first set and/or to the sun gear S2 which also has holding means B2.

The numbers of teeth in the various elements of the four gear sets is shown in Table IV and Table V shows the clutches and brakes energized to engage the various forward and reverse ratios and the values of the ratios obtained. It will be seen that these values accord closely with the typically desired values.

Table IV

| | Train No. | 2 | 1 | 4 | 3 |
|---|---|---|---|---|---|
| Teeth in: | Ring | 78 | 84 | 84 | 84 |
| | Planet | 18 | 24 | 18 | 18 |
| | Sun | 42 | 36 | 48 | 48 |

Table V

| Forward Ratios | | | | |
|---|---|---|---|---|
| 1st | C1 | + | B3 | 6.76 :1 |
| Optional | C1 | + | B4 | 4.67 :1 |
| 2nd | C1 | + | B1 | 3.33 :1 |
| 3rd | C1 | + | B2 | 1.816:1 |
| 4th | C1 | + | C2 | 1.00 :1 |

| Reverse Ratios | | | | |
|---|---|---|---|---|
| 1st | C2 | + | B3 | −6.05 :1 |
| 2nd | C2 | + | B4 | −3.49 :1 |
| 3rd | C2 | + | B1 | −1.857:1 |

Figure 4:
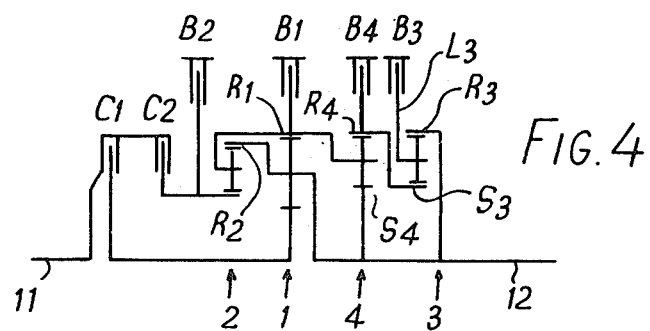
FIG. 4 shows a modification of the transmission of FIG. 3.

In the embodiment shown in FIG. 4, the ring gear R3 and the sun gear S4 are connected to the output member 12 while the sun gear S3 is connected to the ring gear R4 and to the holding means B4. The planet carrier L3 is connected to the holding means B3 while the planet carrier L4 is connected to the ring gear R1. The connections of the elements of the first and second gear sets are the same as in FIG. 3. The numbers of teeth on the various elements is shown in Table VI.

Table VI

| | Train No. | 2 | 1 | 4 | 3 |
|---|---|---|---|---|---|
| Teeth in: | Ring | 78 | 84 | 84 | 84 |
| | Planet | 26 | 28 | 24 | 18 |
| | Sun | 26 | 28 | 36 | 48 |

Table VII shows the clutches and brakes engaged to obtain the various ratios and the values of the resulting ratios.

Table VII

| Forward Ratios | | | | |
|---|---|---|---|---|
| 1st | C1 | + | B3 | 6.78 :1 |
| Optional | C1 | + | B1 | 4.0 :1 |
| 2nd | C1 | + | B4 | 3.1 :1 |
| 3rd | C1 | + | B2 | 1.75 :1 |
| 4th | C1 | + | C2 | 1.00 :1 |

| Reverse Ratios | | | | |
|---|---|---|---|---|
| 1st | C2 | + | B3 | −6.71 :1 |
| 2nd | C2 | + | B4 | −3.0 :1 |
| 3rd | C2 | + | B1 | −1.8 :1 |

The resulting ratios are not exactly in accordance with the ratios mentioned above as being desirable in an average Loader but they are quite suitable for some Loaders and for other "shuttle-type" vehicles.

The tooth numbers given above are of course examples and can be varied to provide alternative values of the ratios within limits imposed by the physical constructions of the various gear sets.

In the embodiments shown in FIGS. 3 and 4, the interconnections between the first and second gear sets correspond to those shown in FIG. 1. These interconnections may be replaced by the interconnections shown in FIG. 2.

I claim:

1. In a multi-speed planetary transmission for a vehicle comprising a plurality of planetary gear sets each comprising an externally toothed sun gear, an internally toothed ring gear coaxial with the sun gear, and at least one planet gear meshing with both the sun gear and the ring gear and rotatably mounted on a planet carrier which is rotatable about the common axis of the sun gear and ring gear, in which the planet carrier of the first set is connected to an output member of the transmission, the planet carrier of the second set is connected to the ring gear of the first set and to releasable holding means, the sun gear of the first set is connected through a first disengageable coupling to the input member of the transmission, and one of the sun and ring gears of the second gear set is connected to releasable holding means and through a second disengageable coupling to the input member, the improvements in which third and fourth planetary gear sets each have a first element connected to the output member and second elements which are connected to each other and a releasable holding means, while the third element of the third set is connected to further releasable holding means and the third element of the fourth set is connected to the ring gear of the first set.

2. A multi-speed planetary transmission according to claim 1, in which the third element of the third set is the planet carrier thereof.

3. A multi-speed planetary transmission according to claim 2, in which the first element of the third and fourth sets are their sun gears and the second element of the third set is its ring gear while the second element of the fourth set is the planet carrier thereof.

4. A multi-speed planetary transmission according to claim 1, in which the first element of the third and fourth sets are respectively the ring gear and the sun gear while the second elements are respectively the sun gear and the ring gear.

* * * * *